United States Patent
Dietsche et al.

(10) Patent No.: US 8,394,208 B2
(45) Date of Patent: Mar. 12, 2013

(54) CARBOXYLATE-CONTAINING POLYMERS FOR METAL SURFACE TREATMENT

(75) Inventors: Frank Dietsche, Schriesheim (DE); Helmut Witteler, Wachenheim (DE); Matthias Kluglein, Ludwigshafen (DE); Frank Klippel, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 25 days.

(21) Appl. No.: 12/730,107

(22) Filed: Mar. 23, 2010

(65) Prior Publication Data

US 2010/0175792 A1 Jul. 15, 2010

Related U.S. Application Data

(62) Division of application No. 11/730,674, filed on Apr. 3, 2007, now abandoned, which is a division of application No. 10/509,891, filed as application No. PCT/EP2004/001590 on Feb. 19, 2004, now Pat. No. 7,655,279.

(30) Foreign Application Priority Data

Feb. 24, 2003 (DE) .................. 103 07 973
Nov. 18, 2003 (DE) .................. 103 53 845

(51) Int. Cl.
C23C 8/00 (2006.01)
C23C 22/00 (2006.01)
C08J 3/22 (2006.01)

(52) U.S. Cl. ........ 148/240; 148/251; 148/259; 148/262; 524/487; 427/430.1; 427/421.1; 427/428.01

(58) Field of Classification Search .................. 524/487; 427/430.1, 421.1, 428.01; 252/287; 148/240, 148/251, 259, 262
See application file for complete search history.

(56) References Cited

U.S. PATENT DOCUMENTS

| | | | |
|---|---|---|---|
| 3,224,908 A | 12/1965 | Duch et al. | |
| 3,242,093 A | 3/1966 | Compton | |
| 4,536,225 A | 8/1985 | Cayless et al. | |
| 4,661,170 A | 4/1987 | Osberghaus et al. | |
| 5,175,361 A | 12/1992 | Denzinger et al. | |
| 5,435,969 A * | 7/1995 | Hoots et al. | 422/14 |
| 5,589,106 A | 12/1996 | Shim et al. | |
| 5,601,723 A * | 2/1997 | Kirk et al. | 210/701 |
| 5,667,849 A * | 9/1997 | Carey et al. | 427/431 |
| 5,681,378 A | 10/1997 | Kerherve | |
| 6,071,994 A | 6/2000 | Hummerich et al. | |
| 6,310,024 B1 | 10/2001 | Gill et al. | |
| 6,514,357 B1 * | 2/2003 | Tada et al. | 148/251 |
| 2003/0042208 A1 | 3/2003 | Chen et al. | |
| 2003/0207133 A1 * | 11/2003 | Preikschat et al. | 428/472 |

FOREIGN PATENT DOCUMENTS

| | | |
|---|---|---|
| CA | 2312807 | 6/1999 |
| DE | 96-506193/50 | 6/1995 |
| DE | 195 16 765 | 11/1996 |
| DE | 196 06 394 | 8/1997 |
| DE | 197 54 108 | 6/1999 |
| DE | 0907762 B1 | 10/2001 |
| EP | 694593 A1 * | 1/1996 |
| EP | 0 907 762 | 4/1999 |
| EP | 907762 B1 * | 10/2001 |
| GB | 2331942 A | 6/1999 |
| WO | WO 96/34995 | 11/1996 |
| WO | WO 97/40208 | 10/1997 |
| WO | WO 00/55391 | 9/2000 |

OTHER PUBLICATIONS

Müller et al, "Amphiphilic copolymers as corrosion inhibitors for zinc pigment," Corrosion Science 42, 2000, pp. 557-587.
Albrecht® CP30: Safety Data Sheet (Date: Aug. 30, 2002).
Albrecht® CP30: Product Technical Data (no publication date).

* cited by examiner

Primary Examiner — Michael M Bernshteyn
(74) Attorney, Agent, or Firm — Nixon & Vanderhye P.C.

(57) ABSTRACT

The present invention relates to a composition for treating surfaces, comprising a copolymer as component A, synthesized from (meth)acrylic acid or salts thereof, a carboxylate-containing monomer and/or monomers containing groups containing phosphoric and/or phosphoric acid or salts thereof, and further comonomers if desired, to a passivating layer on a metal surface, which comprises component A, to a process for forming said passivating layer, and to the use of the composition of the invention to passivate a metal surface.

14 Claims, No Drawings

CARBOXYLATE-CONTAINING POLYMERS FOR METAL SURFACE TREATMENT

CROSS REFERENCE TO RELATED APPLICATIONS

This application is a divisional of commonly owned U.S. application Ser. No. 11/730,674 filed on Apr. 3, 2007 (now abandoned), which in turn is a divisional of U.S. application Ser. No. 10/509,891 filed on Oct. 1, 2004 (now U.S. Pat. No. 7,655,279), which is the US national phase entry of PCT/EP2004/01590 filed Feb. 19, 2004 and claims the benefit of priority of DE 10307973.4 filed Feb. 24, 2003 and DE 10353845.3 filed Nov. 18, 2003, the entire contents thereof being hereby expressly incorporated by reference in this application.

The present invention relates to a composition for treating surfaces, comprising a carboxylate-containing polymer, to a passivating layer on a metal surface, comprising a carboxylate-containing polymer, to a process for forming this passivating layer, and to the use of the composition of the invention to passivate a metal surface, to a coating system on a metal surface, comprising said passivating layer and an applied coating system, and also to a process for forming this coating system.

Metallic materials, particularly iron and steel, are commonly galvanized in order to protect them against corrosive environment effects. The corrosion protection afforded by the zinc is based on the fact that it is baser than the metallic material and consequently draws the corrosive attack exclusively to itself first of all—that is, it functions as a sacrificial layer. The metallic material itself remains intact as long as it is still covered by a continuous layer of zinc, and the mechanical functionality is retained for longer periods of time than in the case of ungalvanized parts. Corrosive attack on such a zinc layer can in turn be retarded by the application of a passivating layer. This is done particularly in the case of electrolytically galvanized parts, and both for parts which are subsequently coated and for those which are employed without a coating. Aluminum surfaces as well, particularly if they are to be coated subsequently, are frequently provided with a passivating layer. The passivating layer retards corrosive attack on the metal surface and at the same time serves to improve the adhesion of any coating films that are to be applied. The term "passivating layer" is frequently replaced, synonymously, by the term "conversion coat".

To date, passivating layers on zinc or aluminum surfaces have usually been obtained by immersing the workpiece to be protected in aqueous acidic solutions of $CrO_3$. Following immersion and drying, the workpiece is protected against corrosion. On immersion, some of the metal to be protected dissolves and immediately thereafter forms an oxide film on the metal surface. This film, therefore, is similar to the oxide film which is present in any case on many metals, but it is much more coherent and better adhering than the latter. From the standpoint of passivation, this Cr(VI) treatment is optimal. Cr(VI) treatment extends the time taken for an uncoated galvanized panel to develop white rust from less than 1 hour to more than 100 hours.

In order to avoid the use of the Cr(VI) compounds, which are extremely toxic and carcinogenic, EP-A 0 907 762 proposes a passivation by means of acidic, aqueous solutions of Cr(III) salts. Applied as a so-called "thick layer", with a thickness of from 300 to 400 μm, these passivating layers offer outstanding corrosion protection.

For the purpose of avoiding the use of heavy metals such as Cr(VI) and also Cr(III), the use of polymers is gaining in importance.

DE-A 195 16 765 relates to a process for producing conversion coats on surfaces of zinc or aluminum by treatment with an acidic solution which comprises an organic film former, aluminum ions in the form of a water-soluble complex with chelate-forming carboxylic acids, and phosphoric acid. Organic film formers mentioned include carboxyl-containing polymers, especially homopolymers and/or copolymers of acrylic and/or methacrylic acid. DE-A 195 16 765, however, contains no information as to which copolymers can be used. The examples related solely to the use of homopolymers. In contradistinction to this the described copolymers by introduction of additional carboxylate functionalities per monomer unit, especially when maleic-acrylic acid copolymers are used, improved corrosion properties achievable. The combination with additional comonomers is suitable for controlling the mechanical and adhesive properties of the polymers.

DE-A 197 54 108 relates to an aqueous corrosion protection composition for the treatment of surfaces of galvanized, including alloy-galvanized, steel and aluminum as well. The corrosion protection composition comprises hexafluoro anions of titanium(IV) and/or zirconium(IV), vanadium ions, cobalt ions, phosphoric acid, and, preferably, an organic film former as well, in particular based on polyacrylate. Precise compositions of copolymers based on acrylic acid and/or methacrylic acid with monomers not based on (meth)acrylic acid are not mentioned in DE-A 197 54 108.

Müller et al., Corrosion Science 42, 577 to 584 (2000) relates to amphiphilic copolymers as corrosion inhibitors for zinc pigments. Copolymers used include styrene-maleic acid-acrylic ester copolymers. Passivating layers on metal surfaces and their preparation are not disclosed.

It is an object of the present invention to provide compositions for treating metal surfaces that are suitable for forming a passivating layer on the metal surfaces. The passivating layer obtained ought to be suitable both for workpieces which are subsequently coated and for those which are employed without a coating. In the case of subsequent coating of the workpieces provided with the passivating layer care should be taken that adequate adhesion to the subsequent coating film is ensured.

This object is achieved by provision of a composition for treating metal surfaces, comprising
a) at least one copolymer as component A, synthesized from
   aa) 50 to 99.9% by weight of (meth)acrylic acid or salts thereof as component Aa
   ab1) 0.1 to 50% by weight of a carboxylate-containing monomer of the formula (I)

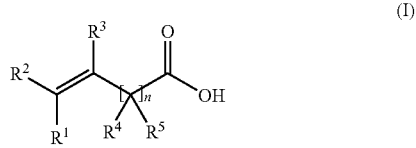

in which the symbols have the following definitions:
n is 0 to 10, preferably 0 to 5, more preferably 0 to 3
$R^1$, $R^2$, and $R^3$ independently of one another are hydrogen, $C_1$ to $C_{18}$ alkyl, which may be branched or unbranched, $C_3$ to $C_6$ cycloalkyl, $C_2$ to $C_{18}$ alkenyl, which may be branched or unbranched, $C_3$ to $C_6$ cycloalkenyl, $C_6$ to $C_{12}$ aryl, which may be substituted by alkyl substituents or other aryl substituents, it being possible for the stated radicals $R^1$, $R^2$ and/or $R^3$ optionally to be substituted by at least one carboxyl group, or are a carboxyl group; preferably $R^1$, $R^2$, and $R^3$ are hydrogen or $C_1$ to $C_{18}$ alkyl, which is unbranched, and is optionally substituted by at least one carboxyl group, or are a carboxyl group; more preferably one of the radicals, $R^1$ or $R^2$ or $R^3$, is a carboxyl group and the other radicals are hydrogen or methyl; or $R^1$, $R^2$, and $R^3$ are hydrogen or methyl;

$R^4$ and $R^5$ are independently of one another hydrogen, $C_1$ to $C_{18}$ alkyl, which may be branched or unbranched, $C_3$ to $C_6$ cycloalkyl, $C_2$ to $C_{18}$ alkenyl, which may be branched or unbranched, $C_3$ to $C_6$ cycloalkenyl, $C_6$ to $C_{12}$ aryl, which may be substituted by alkyl substituents or other aryl substituents; preferably $R^4$ and $R^5$ are hydrogen or $C_1$ to $C_{18}$ alkyl, which is unbranched; very preferably hydrogen or methyl;

or salts, anhydrides, esters of compounds of the formula I, very preferably maleic acid, fumaric acid, itaconic acid, crotonic acid or their salts, esters, anhydrides, with the exception of (meth)acrylic acid or salts thereof, as component Ab1, and/or ab2) 0.1 to 50% by weight of monomers containing groups containing phosphoric and/or phosphonic acid or salts thereof and polymerizable with the monomers specified under aa) and ac), and also with component Ab1, as component Ab2;

ac) 0 to 30% by weight of further comonomers polymerizable with the monomers specified under aa) and ab), as component Ac;

b) water or another solvent capable of dissolving, dispersing, suspending or emulsifying the polymer (component A), as component B;

c) where appropriate, further surface-active additives, dispersants, suspension agents and/or emulsifiers as component C.

The copolymers used in the compositions of the invention are completely hydrophilic copolymers. Passivating layers comprising the hydrophilic copolymers used in accordance with the invention exhibit outstanding corrosion protection and are very highly suitable for subsequent treatments, a coating operation for example.

The metal surface used can generally be any desired metal surface. Preferably the metal surface comprises aluminum or aluminum alloys or zinc or zinc alloys, a surface of zinc or zinc alloys generally being obtained by an operation of galvanizing a metallic material such as iron or steel.

Component A

Component A comprises a copolymer synthesized from aa) 50 to 99.9% by weight, preferably 50 to 90% by weight, more preferably 50 to 75% by weight of (meth)acrylic acid or salts thereof as component Aa, ab1) 0.1 to 50% by weight, preferably 2 to 50% by weight, more preferably 5 to 40% by weight, of a carboxylate-containing monomer of the formula

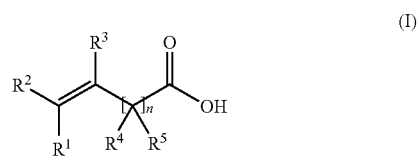

in which the symbols have the following definitions:

n is 0 to 10, preferably 0 to 5, more preferably 0 to 3;

$R^1$, $R^2$, $R^3$ independently of one another are hydrogen, $C_1$ to $C_{18}$ alkyl, which may be branched or unbranched, $C_3$ to $C_6$ cycloalkyl, $C_2$ to $C_{18}$ alkenyl, which may be branched or unbranched, $C_3$ to $C_6$ cycloalkenyl, $C_6$ to $C_{12}$ aryl, which may be substituted by alkyl substituents or other aryl substituents, it being possible for the stated radicals $R^1$, $R^2$ and/or $R^3$ optionally to be substituted by at least one carboxyl group, or are a carboxyl group; preferably $R^1$, $R^2$, and $R^3$ are hydrogen or $C_1$ to $C_{18}$ alkyl, which is unbranched, and is optionally substituted by at least one carboxyl group, or are a carboxyl group; more preferably one of the radicals, $R^1$ or $R^2$ or $R^3$, is a carboxyl group and the other radicals are hydrogen or methyl; or $R^1$, $R^2$, and $R^3$ are hydrogen or methyl;

$R^4$ and $R^5$ are independently of one another hydrogen, $C_1$ to $C_{18}$ alkyl, which may be branched or unbranched, $C_3$ to $C_6$ cycloalkyl, $C_2$ to $C_{18}$ alkenyl, which may be branched or unbranched, $C_3$ to $C_6$ cycloalkenyl, $C_6$ to $C_{12}$ aryl, which may be substituted by alkyl substituents or other aryl substituents, preferably $R^4$ and $R^5$ are hydrogen or $C_1$ to $C_{18}$ alkyl, which is unbranched, very preferably hydrogen or methyl;

or salts, anhydrides, esters of compounds of the formula I, very preferably maleic acid, fumaric acid, itaconic acid, crotonic acid or their salts, esters, anhydrides, with the exception of (meth)acrylic acid or salts thereof, as component Ab1;

and/or ab2) 0.1 to 50% by weight, preferably 1 to 20% by weight, very preferably 2 to 10% by weight of monomers containing groups containing phosphoric and/or phosphonic acid or salts thereof, and polymerizable with the monomers specified under aa) and ac) and also with component Ab1, as component Ab2;

ac) 0 to 30% by weight, preferably 0 to 20% by weight, more preferably 0 to 10% by weight of further comonomers polymerizable with the monomers specified under aa) and ab), as component Ac.

Component Aa

Component Aa comprises (meth)acrylic acid or a salt of (meth)acrylic acid. It is also possible to use mixtures of the stated components as component Aa.

Suitable salts of (meth)acrylic acid are in particular the alkali metal and alkaline earth metal salts, preferably lithium, sodium or potassium salts.

As component Aa it is preferred to use acrylic and/or methacrylic acid.

Component Ab1

As component Ab1 is at least one carboxylate-containing monomer of the formula I

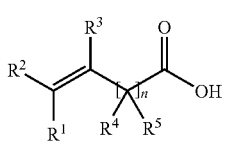

(I)

in which the symbols have the following definitions:

n is 0 to 10, preferably 0 to 5, more preferably 0 to 3

$R^1$, $R^2$, and $R^3$ independently of one another are hydrogen, $C_1$ to $C_{18}$ alkyl, which may be branched or unbranched, $C_3$ to $C_6$ cycloalkyl, $C_2$ to $C_{18}$ alkenyl, which may be branched or unbranched, $C_3$ to $C_6$ cycloalkenyl, $C_6$ to $C_{12}$ aryl, which may be substituted by alkyl substituents or other aryl substituents, it being possible for the stated radicals $R^1$, $R^2$ and/or $R^3$ optionally to be substituted by at least one carboxyl group, or are a carboxyl group; preferably $R^1$, $R^2$, and $R^3$ are hydrogen or $C_1$ to $C_{18}$ alkyl, which is unbranched, and is optionally substituted by at least one carboxyl group, or are a carboxyl group; more preferably one of the radicals, $R^1$ or $R^2$ or $R^3$, is a carboxyl group and the other radicals are hydrogen or methyl; or $R^1$, $R^2$, and $R^3$ are hydrogen or methyl;

$R^4$ and $R^5$ are independently of one another hydrogen, $C_1$ to $C_{18}$ alkyl, which may be branched or unbranched, $C_3$ to $C_6$ cycloalkyl, $C_2$ to $C_{18}$ alkenyl, which may be branched or unbranched, $C_3$ to $C_6$ cycloalkenyl, $C_6$ to $C_{12}$ aryl, which may be substituted by alkyl substituents or other aryl substituents; preferably $R^4$ and $R^5$ are hydrogen or $C_1$ to $C_{18}$ alkyl, which is unbranched, very preferably hydrogen or methyl;

or salts, anhydrides, esters of compounds of the formula I, very preferably maleic acid, fumaric acid, itaconic acid, crotonic acid or their salts, esters, anhydrides, with the exception of (meth)acrylic acid or salts thereof.

Component Ab1 is preferably selected from at least one compound selected from the group consisting of crotonic acid, maleic acid, fumaric acid, itaconic acid, salts, esters, and anhydrides of said acids.

Suitable salts of the aforementioned acids are in particular the alkali metal salts and alkaline earth metal salts. Suitable esters are the reaction products of the stated acids with $C_1$ to $C_{20}$ alcohols, preferably $C_1$ to $C_{16}$ alcohols, very preferably with $C_1$ to $C_{16}$ alcohols.

Preference is given to using maleic acid, salts or esters of maleic acid, or maleic anhydride. Salts and esters used with preference have already been mentioned above.

Very particular preference is given to using maleic anhydride as component Ab1.

Component Ab 2

In addition to component Ab1 or instead of component Ab1, the copolymer (component A) is synthesized from monomers containing groups containing phosphoric and/or phosphonic acid or salts thereof, polymerizable with the monomers specified under aa) and ac), and also with component Ab1.

Suitable monomers are preferably monomers of the general formulae

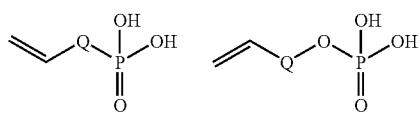

in which Q can have the following definitions:

a single bond, an alkylene group having 1 to 6 carbon atoms in a chain, it being possible for one or more, preferably 1 or 2, carbon atoms of the alkylene group to be substituted by alkyl groups, preferably methyl, by O-containing groups, preferably —OH, by phosphoric acid groups and/or by =O, and/or for one or more, preferably 1 or 2, nonadjacent carbon atoms to be replaced by —O—.

With particular preference, suitable monomers containing groups containing phosphoric and/or phosphoric acid or salts thereof, and polymerizable with the monomers specified under an) and ac), and also with component Ab1, are selected from the group consisting of Vinylphosphonic Acid

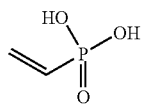

Phosphoric Acid Monovinyl Ester

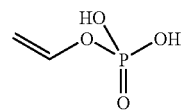

Allylphosphonic Acid

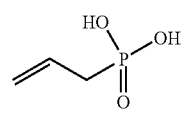

Phosphoric Acid Monoallyl Ester

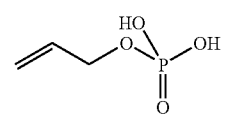

3-Butenylphosphonic Acid

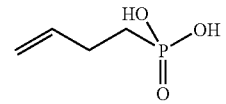

7

Phosphoric acid mono-3-butenyl ester

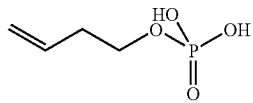

Phosphoric acid mono-4-vinyloxybutyl ester

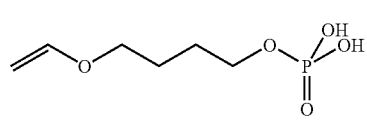

Acrylic Acid Phosphonoxyethyl Ester

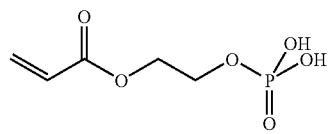

Methacrylic Acid Phosphonoxyethyl Ester

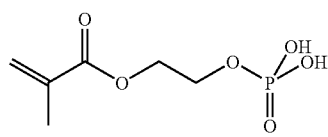

Phosphoric acid mono-2-hydroxy-3-vinyloxypropyl ester

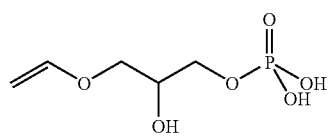

8

Phosphoric acid mono-1-phosphonoxymethyl-2-vinyloxyethyl ester

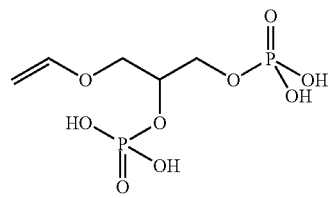 [SMILES: C=COCC(COP(=O)(O)O)OP(=O)(O)O]

Phosphoric acid mono-3-allyloxy-2-hydroxypropyl ester

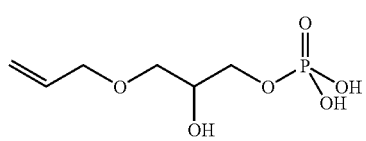

Phosphoric acid mono-2-allyloxy-1-phosphonoxymethylethyl ester

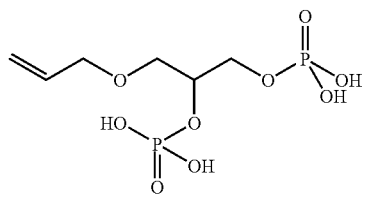 [SMILES: C=CCOCC(COP(=O)(O)O)OP(=O)(O)O]

2-Hydroxy-4-vinyloxymethyl-1,3,2-dioxaphosphole

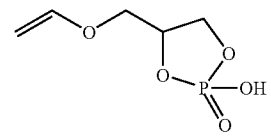

2-Hydroxy-4-allyloxymethyl-1,3,2-dioxaphosphole

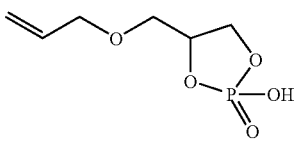

and

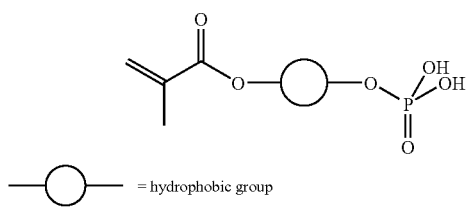

= hydrophobic group

In addition it is possible to use the salts of the aforementioned monomers. Suitable salts are in particular the alkali metal and alkaline earth metal salts, preferably lithium, sodium or potassium salts.

Particular preference is given to vinylphosphonic acid and to methacrylic acid phosphonoxyethyl ester.

By a hydrophobic group is meant any desired hydrophobic group known to the skilled worker. The hydrophobic group is preferably an alkylene group —$(CR^aR^b)_n$— in which n=1 to 10 and $R^a$ and $R^b$ independently of one another are hydrogen, $C_1$ to $C_6$ alkyl or aryl, which may optionally be substituted, phenyl for example. In another preferred embodiment the hydrophobic group is made up of alkylene oxide units, preferably ethylene oxide, propylene oxide and/or butylene oxide units, more preferably ethylene oxide and/or propylene oxide units. The hydrophobic group is preferably constructed from 3 to 10 of the aforementioned alkylene oxide units. The hydrophobic group may additionally be a polytetrahydrofuran group. It is likewise possible for the hydrophobic group to be composed of two or more different groups from those mentioned above, i.e., from alkylene groups and/or alkylene oxide units and/or polytetrahydrofuran groups. With very particular preference the hydrophobic group is composed of an alkylene unit of the formula —$(CH_2)_n$— with n=1-10, 2 to 10 ethylene oxide units or 2-10 propylene oxide units.

In addition to monomers of component Aa, therefore, the copolymers (component A) may be composed both of monomers of component Ab1 and of monomers of component Ab2. It is likewise possible for the copolymers (component A) to be synthesized, besides monomers of component Aa, either from monomers of component Ab1 or from monomers of component Ab2. In each case the copolymers (component A) may additionally where appropriate be synthesized from comonomers of component Ac.

Component Ac

Suitable as component Ac are all comonomers which are polymerizable with the monomers specified under aa) and ab). Such monomers are preferably ethylenically unsaturated monomers.

Examples of suitable monomers containing at least one ethylenically unsaturated group include the following: olefins such as ethylene or propylene, vinylaromatic monomers such as styrene, divinylbenzene, 2-vinylnaphthalene, and 9-vinylanthracene, substituted vinylaromatic monomers such as p-methylstyrene, α-methylstyrene, o-chlorostyrene, p-chlorostyrene, 2,4-dimethylstyrene, 4-vinylbiphenyl, and vinyltoluene, esters of vinyl alcohol and monocarboxylic acids containing 1 to 18 carbon atoms, such as vinyl acetate, vinyl propionate, vinyl-n-butyrate, vinyl laurate, and vinyl stearate, anhydrides or esters of α,β-monoethylenically unsaturated monocarboxylic and dicarboxylic acids containing 3 to 6 carbon atoms (with the exception of the compounds specified as component Ab), such as acrylic acid and methacrylic acid in particular, with alkanols having generally 1 to 20, preferably 1 to 12, more preferably 1 to 8, and very preferably 1 to 4 carbon atoms, such as, in particular, methyl, ethyl, n-butyl, isobutyl, tert-butyl, and 2-ethylhexyl esters of acrylic acid and methacrylic acid, dimethyl maleate or n-butyl maleate, or the esters of the stated carboxylic acids with alkoxy compounds, ethylene oxide or polyethylene oxide for example, such as ethylene oxide acrylate or ethylene oxide methacrylate, the nitriles of the aforementioned α,β-monoethylenically unsaturated carboxylic acids, such as acrylonitrile and methacrylonitrile, and also $C_{4-5}$ conjugated dienes such as 1,3-butadiene and isoprene, and N-vinyl compounds, such as N-vinylpyrrolidone and N-vinylformamide, for example: vinyl ethers, $H_2C=CH—OR^5$, in which $R^5$ is a $C_1$ to $C_{18}$ alkyl radical, which may be branched or unbranched, and also suitable monomers containing sulfone or sulfate groups.

Suitable styrene compounds include those of the general formula II:

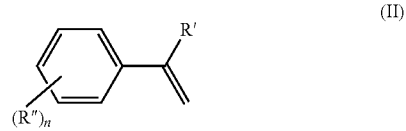

(II)

in which R' and R" independently of one another are H or $C_1$ to $C_8$ alkyl and n is 0, 1, 2 or 3.

Particular preference in the process of the invention is given to using the monomers styrene, α-methylstyrene, divinylbenzene, vinyltoluene, N-vinylpyrrolidone, and N-vinylformamide, $C_1$ to $C_{20}$ alkyl acrylates- and $C_1$ to $C_{20}$ alkyl methacrylates, especially n-butyl acrylate, 2-ethylhexyl acrylate or methyl methacrylate, and butadiene, and also acrylonitrile, glycidyl esters and (poly)alkoxylates of acrylic and methacrylic acid, and also monomer mixtures composed of at least 85% by weight of the aforementioned monomers or mixtures of the aforementioned monomers.

With very particular preference component A is a copolymer synthesized from acrylic acid and maleic anhydride. The fraction of acrylic acid in this case is preferably 50 to 99% by weight, more preferably 50 to 80% by weight, and the fraction of maleic anhydride is 1 to 50% by weight, more preferably 15 to 40% by weight. In another preferred embodiment component A is a terpolymer synthesized from (meth)acrylic acid, maleic anhydride, and vinylphosphonic acid. The terpolymer is synthesized preferably from 20 to 80% by weight of (meth) acrylic acid, 10 to 40% by weight of maleic anhydride, and 0.1 to 30% by weight, preferably 0.1 to 20% by weight, of vinylphosphonic acid.

The polymers used as component A can be prepared by any procedures known to the skilled worker. The copolymers are prepared preferably by free-radical copolymerization of the stated components Aa, Ab1 and/or Ab2 and, where appropriate, Ac. The proportions of the components used have already been stated above. The free-radical copolymerization can take place for example in solution, emulsion, dispersion, suspension or in bulk.

Suitable polymerization processes for preparing the polymers used as component A are set out, for example, in DE-A 196 06 394.

With particular preference the copolymers (A) are prepared by free-radical copolymerization in solution. The solvent is preferably selected from the group consisting of water, alcohols, ethers, and ketones, preferably water.

Where anhydride copolymers are obtained they are preferably hydrolyzed by adding suitable amounts of demineralized water and at least one nitrogen base. Preferred nitrogen bases used are tertiary alkaline amines, more preferably hydroxylamines such as mono-, di-, and triethanolamine, 3-dimethylaminopropylamine, and imidazole.

The polymerization conditions are known to the skilled worker.

In another embodiment the carboxylate-containing copolymers (component A) can be obtained by means of polymer-analogous reactions. Suitable polymer-analogous reactions are known to the skilled worker. For example, the preparation of the carboxylase-containing copolymers by corresponding functionalization of copolymers prepared by copolymerization; by reaction of polyhydric alcohols with polybasic carboxylic acids and/or compounds containing phosphoric acid groups is possible.

The term "copolymers" is intended in general to be understood as meaning those compounds which contain at least 3 repeating units, preferably more than 10 repeating units. The weight average of the molecular weight (Mw) of the copolymers used in accordance with the invention is generally from 500 to 5 000 000 g/mol, preferably from 1000 to 0.5 million g/mol. The polymer can also contain a small level of partial crosslinking, so that, while no molecular weight can be stated, the polymer can be dispersed, emulsified or suspended in common industry solvents. The molecular weight (Mw) was determined by means of gel permeation chromatography using a polystyrene standard.

The copolymers used as component A in accordance with the invention are hydrophilic copolymers. Passivating layers comprising these hydrophilic copolymers are outstandingly suitable for subsequent coating.

Component B

Component B is water or another solvent capable of dissolving, dispersing, suspending or emulsifying the copolymer (component A). For the purposes of the present text a solvent is a liquid matrix in which the various ingredients of the composition of the invention are present in a very finely divided form. Such fine division can be, for example, in the sense of a molecularly disperse distribution, a true solution of the ingredients in the solvent. However, the term "solvent" also encompasses liquid matrices in which the ingredients are distributed in the sense of an emulsion or dispersion, i.e., do not form a molecularly disperse solution.

Examples of suitable solvents include water and also water-miscible and water-immiscible solvents. Examples of suitable water-miscible solvents are primary or secondary mono- or polyalcohols having 1 to about 6 carbon atoms, such as methanol, ethanol, propanol, isopropanol, n-butanol, isobutanol, pentanol, hexanol, cyclohexanol or glycerol. Likewise suitable as water-miscible solvents are low molecular mass ketones such as acetone or methyl ethyl ketone or ether alcohols such as diethylene glycol or triethyl glycol. Likewise suitable in the context of the present invention are solvents which are of low or zero miscibility with water. These include, for example, ethers such as diethyl ether, dioxane or tetrahydrofuran, aromatic solvents such as toluene or xylene, halogenated solvents such as dichloromethane, chloroform or tetrachloromethane, and optionally substituted aliphatic solvents, including for example the higher homologues of the abovementioned alcohols and ketones and also paraffinic hydrocarbons.

The abovementioned solvents can be used individually or as a mixture of two or more of said solvents. In one preferred embodiment of the present invention the solvent used is water, alone or in a mixture with one or more of the abovementioned, preferably water-soluble, solvents. If a solvent is to be used in the context of the present invention that contains water and a water-immiscible solvent, then the solvent can contain, for example, an emulsifier in order to allow a substantially stable W/O or O/W emulsion.

If the composition of the invention comprises a mixture of water and another, water-miscible solvent, the fraction of water in such a mixture is preferably at least about 30% by weight or more, for example at least about 40% or at least about 50% by weight. In one particularly preferred embodiment of the present invention the water fraction is at least about 75% by weight. Examples of suitable combinations of water and water-miscible solvents are water/methanol, water/ethanol, water/propanol or water/isopropanol. Preferred in the context of the present invention is a mixture of water and ethanol, the water fraction being preferably greater than about 75% by weight, for example, greater than about 80% or about 85% by weight.

In one preferred embodiment of the present invention a composition of the invention comprises at least one solvent which has a water content of at least about 50% by weight.

With particular preference water exclusively is used as solvent.

The composition used preferably as aqueous solution in accordance with the invention generally has a pH of from 1 to 6, it being possible to choose narrower pH ranges depending on the substrate and mode of application and also on the period of exposure of the surface of the substrate metal to the composition used in accordance with the invention. By way of example, for the treatment of bright metal surfaces the pH is preferably adjusted to the range from 2 to 6, preferably to the range from 2 to 4 when treating aluminum surfaces, and preferably to the range from 3 to 5 when treating steel, zinc or galvanized steel. Surfaces of a substrate metal which have already been pretreated and which carry, for example, a phosphate layer are preferably contacted with a composition used in accordance with the invention with a pH of from 3.5 to 5.

The amount of water or another solvent is a function of whether the composition of the invention is a ready-to-use composition or a concentrate, and also of the respective end use. Basically, the amount is a function of the concentrations of the individual components that are specified for the ready-to-use composition.

Component C

Where appropriate, the composition of the invention may further comprise surface-active compounds, emulsifiers and/or dispersants. Suitable surface-active compounds are surfactants, which may be cationic, anionic, zwitterionic or nonionic. Examples of suitable surfactants are alkyl and alkenyl alkoxylates of the type R-EO$_n$/PO$_m$ in which R are generally linear or branched $C_6$-$C_{30}$ alkyl radicals, preferably $C_8$-$C_{20}$ alkyl radicals, and EO is an ethylene oxide unit and PO is a propylene oxide unit, the sequential arrangement of EO and PO being arbitrary, and n and m independently of one another being >1 and <100, preferably >3 and <50, examples being Emulan®, Lutensol® and Plurafac® (from BASF), alkylphenol ethoxylates, EO/PO block copolymers (Pluronic®, from BASF), alkyl ether-sulfates, and alkylammonium salts, referred to as quats.

The amount of these components in the composition of the invention is generally 0.01-100 g/l, preferably from 0.1 to 20 g/l.

The composition used in accordance with the invention preferably comprises further to components A, B, and, where appropriate, C d) at least one nitrogen base as component D.

Preferred nitrogen bases used are tertiary alkaline amines, more preferably hydroxylamines such as mono-, di-, and triethanolamine, 3-dimethylaminopropylamine, and imidazole.

The base can be used to hydrolyze the copolymers (component A), especially the copolymers based on (meth)acrylic acid and maleic anhydride and, where appropriate, vinylphosphonic acid or, where appropriate, methacrylic acid phosphonoxyethyl ester. Preferably, however, the hydrolysis of the copolymers takes place by adding water.

It is likewise possible to carry out hydrolysis of the copolymers with suitable amounts of water and a nitrogen base (component D) directly following the preparation of the copolymers. In such a case the subsequent addition of a nitrogen base to the composition of the invention comprising the components A, B, and, where appropriate, C is no longer necessary.

In one preferred embodiment the composition of the invention is used to treat metal surfaces and comprises further to components A, B, where appropriate C, and, where appropriate, D e) at least one salt, acid or base based on transition metal cations, transition metal oxo anions, fluorometallates or lanthanoids as component E, and/or f) at least one acid or one alkali metal or alkaline earth metal salt of said acid selected from the group consisting of phosphoric acid, sulfuric acid, sulfonic acids, formic acid, acetic acid, nitric acid, hydrofluoric acid, and hydrochloric acid, as component F, and/or g) at least one further corrosion inhibitor as component G, and/or h) compounds of Ce, Ni, Co, V, Fe, Zn, Zr, Ca, Mn, Mo, W, Cr and/or Bi as component H, and/or i) further auxiliaries and additives as component I, and/or j) at least one complexing agent as component J, and/or k) further additives as component K.

These compositions are outstandingly suitable for passivating, especially for passivating the metal surfaces mentioned in the present specification.

Component E

Suitable components E are salts, acids, and bases based on transition metal cations, transition metal oxo anions, fluorometallates or lanthanoids. Suitable transition metal cations are, in particular, fluorometallates of Ti(IV), Zr(IV), Hf(IV) and/or Si(IV), and a particularly suitable lanthanoid is Ce. Also suitable are tungstates and molybdates.

Compositions in accordance with the present specification which comprise component E are especially suitable either for depositing a corrosion protection coat on a metal surface or for reinforcing the corrosion protection effect of a corrosion coat already deposited on the metal surface. In the compositions of the invention, the inventively used polymers (component A) have an outstanding corrosion protection effect. However, the addition of component E is not necessary for the compositions of the invention to provide excellent corrosion protection properties. In one embodiment, therefore, compounds of component E are absent from the compositions of the invention.

The amount of component E—where component E is present in the compositions of the invention—is preferably from 0.02 to 20 g/l.

Component F

In addition to or instead of component E, the compositions of the invention may further comprise at least one acid or at least one alkali metal or alkaline earth metal salt of said acid selected from the group consisting of phosphoric acid, sulfuric acid, sulfonic acids such as methanesulfonic acid, vinylsulfonic acid, allylsulfonic acid, m-nitrobenzenesulfonic acid, naphthalenesulfonic acid, and derivatives thereof, formic acid, acetic acid, nitric acid, hydrofluoric acid, and hydrochloric acid. The nature of the acid used is dependent on the type of treatment of the metal surface. Accordingly, phosphoric acid is generally used in phosphating baths for phosphating steel surfaces. In this case the composition of the invention is a phosphating solution. A distinction is made here between what are known as "non-film-forming" phosphating solutions, i.e., solutions containing no divalent metals. These non-film-forming phosphating solutions are in the form, for example, of an iron phosphating solution. Where the phosphating solutions do contain ions of divalent metals, e.g., zinc and/or manganese, the phosphating solutions are said to be "film-forming". Compositions in accordance with the present specification that comprise nitric acid are particularly suitable for the surface treatment of zinc and its alloys, whereas compositions comprising hydrofluoric acid are particularly suitable for the surface treatment of aluminum and its alloys.

The amount of acid used may vary depending on the field of application. In general, where component F is present in the compositions of the invention, it is used at from 0.2 to 700 g/l, preferably from 0.2 to 500 g/l, more preferably from 2 to 200 g/l, very preferably from 5 to 150 g/l.

Component G

In addition to or instead of components E and/or F, the compositions of the invention may comprise at least one further corrosion inhibitor. Suitable corrosion inhibitors are selected from the group consisting of butynediol, benzotriazole, aldehydes, amine carboxylates, aminophenols and nitrophenols, amino alcohols, aminobenzimidazole, aminoimidazolines, aminotriazole, benzimidazolamines, benzothiazoles, benzotriazole derivatives, esters of boric acid with various alkanolamines, such as boric acid diethanolamine ester, for example, carboxylic acids and their esters, quinoline derivatives, dibenzyl sulfoxide, dicarboxylic acids and their esters, diisobutenylsuccinic acid, dithiophosphonic acid, fatty amines and fatty acid amides, guanidine derivatives, urea and its derivatives, laurylpyridinium chloride, maleamides, mercaptobenzimidazole, N-2-ethylhexyl-3-aminosulfopropionic acid, phosphonium salts, phthalamides, amine- and sodium-neutralized phosphoric esters of alkyl alcohols, and also these phosphoric esters themselves, phosphoric esters of polyalkoxylates, and particularly of polyethylene glycol, polyetheramines, sulfonium salts, sulfonic acids such as methanesulfonic acid, for example, thioethers, thioureas, thiuramide sulfides, cinnamic acid and its derivatives, zinc phosphates and zinc silicates, zirconium phosphates and zirconium silicates and alkynediol alkoxylates, especially butynediol ethoxylate, butynediol propoxylate, propargyl alcohol ethoxylate, and propargyl alcohol propoxylate.

As further corrosion inhibitors it is preferred to use butynediol and benzotriazole and alkynediol alkoxylates such as butynediol ethoxylate, butynediol propoxylate, propargyl alcohol ethoxylate, and propargyl alcohol propoxylate.

If used at all in the compositions, the corrosion inhibitors are used in an amount of generally from 0.01 to 50 g/l, preferably from 0.1 to 20 g/l, with particular preference from 1 to 10 g/l.

Component H

In addition to or, where appropriate, instead of the above-mentioned components, it is also possible to employ compounds of Ce, Ni, Co, V, Fe, Zn, Zr, Ca, Mn, Mo, W, Cr and/or Bi. In general, the use of component A in accordance with the invention in the compositions results in such good corrosion protection properties that the addition of the abovementioned compounds is unnecessary, i.e., in one embodiment of the invention the compositions are free from compounds of component H. Preferably the compositions of the invention are free from Cr(VI). Where, nevertheless, the aforementioned compounds (component H) are used, it is preferred to use compounds selected from Fe, Zn, Zr and Ca. The amount of these compounds in the compositions of the invention, where they are present at all, is generally from 0.01 to 100 g/l, preferably from 0.1 to 50 g/l, with particular preference from 1 to 20 g/l.

Component I

In addition to one or more of the stated components E to H, the compositions of the invention may comprise further auxiliaries and additives. Suitable auxiliaries and additives include conductivity pigments or conductive fillers, e.g., iron phosphide, vanadium carbide, titanium nitride, carbon black, graphite, molybdenum disulfide or tin- or antimony-doped barium sulfate, with iron phosphide being preferred. Conductivity pigments or conductive fillers of this type are added to the compositions of the invention in order to improve the weldability of the metal surfaces to be treated or in order to improve subsequent coating with electrocoat materials. Moreover, silica suspensions may be employed, particularly when the compositions are used for the treatment of surfaces comprising aluminum.

These auxiliaries and/or additives are generally present in finely divided form; in other words, their mean particle diameters are generally from 0.005 to 5 µm, preferably from 0.05 to 2.5 µm. The amount of the auxiliaries and additives is generally from 0.1 to 50% by weight, preferably from 2 to 35% by weight, based on the overall mass of the compositions of the invention.

Component J

The compositions of the invention may, where appropriate, further comprise a complexing agent. Examples of suitable complexing agents include ethylenediaminetetraacetic acid (EDTA), ethylenediamine (ED), citric acid, and salts of said compounds.

The amount of the compounds used as complexing agents is dependent on the salt load in the compositions of the invention and can be determined without problems for the skilled worker by means, for example, of titration.

Component K

In addition to the abovementioned components, the compositions of the invention may include further additives. Suitable additives are 1-(2-vinylpyridinium)-2-ethylsulfobetaine, 1,1-dimethyl-2-propynyl-1-amine, 1-pyridinium-2-ethylsulfobetaine, 1-pyridinium-2-hydroxy-3-propylsulfobetaine, 1-pyridinium-3-propylsulfobetaine, 2,2'-dichlorodiethyl ether, 2,5-dimethyl-3-hexyne-2,5-diol, 2-butyne-1,4-diol, 2-butyne-1,4-diol ethoxylate, 2-butyne-1,4-diol propoxylate, sodium 3-(2-benzothiazolylthio)-propanesulfonate, sodium 3,3'-dithiobis(1-propanesulfonate), 3-[(aminoiminomethyl)thio]-1-propanesulfonic acid, sodium 3-[(dimethylamino)thioxomethyl]thio-1-propanesulfonate, potassium 3-[ethoxy-thioxomethyl]thio-1-propanesulfonate, sodium 3-chloro-2-hydroxy-1-propanesulfonate, 3-hexyne-2,5-diol, sodium 3-mercapto-1-propanesulfonate, 4,4'-dihydroxydiphenyl sulfone, 4-methoxybenzaldehyde, aldehydes, alkylphenyl polyethylene oxide sulfopropyl ether potassium salts, alkyl polyethylene oxide sulfopropyl ether potassium salts such as, for example, tridecyl/pentadecyl polyethylene oxide sulfopropyl ether potassium salt, sodium allylsulfonate, amidosulfonic acid, amine- and sodium-neutralized phosphoric esters of alkyl alcohols, amine carboxylates, aminophenols and nitrophenols, amino alcohols, aminobenzimidazole, aminoimidazolines, aminotriazole, methyl benzylacetoacetate, benzylacetone, benzimidazolamines, benzothiazoles, benzotriazole and its derivatives, benzyl pyridine-3-carboxylate, bisphenol A, esters of boric acid with various alkanolamines such as, for example, boric acid diethanol ester, carboxylic acids and their esters, carboxyethylisothiuronium betaine, quinoline derivatives, copolymers of ethylene and acrylic acid, copolymers of imidazole and epichlorohydrin, copolymers of imidazole, morpholine and epichlorohydrin, copolymers of N,N'-bis[3-(dimethylamino)propyl]urea and 1,1'-oxybis[2-chloroethane], copolymers of n-butyl acrylate, acrylic acid, and styrene, dibenzyl sulfoxide, dicarboxylic acids and their esters, diethylenetriaminepentaacetic acid and salts derived from it, diisobutenylsuccinic acid, disodium ethylenebisdithiocarbamate, dithiophosphonic acid, ethylamidosulfonic acid, ethylenediaminetetraacetic acid and salts derived from it, ethylglycinediacetic acid and salts derived from it, ethylhexanol ethoxylate, fatty amines and fatty acid amides, formaldehyde, glycerol ethoxylate, guanidine derivatives, urea and its derivatives, hydroxyethyliminodiacetic acid and salts derived from it, imidazole, isopropylamidosulfonic acid, isopropylamidosulfonyl chloride, laury/myristyltrimethylammonium methosulfate, laurylpyridinium chloride, maleamides, mercaptobenzimidazole, methylamidosulfonic acid, N,N,N',N'-tetrakis(2hydroxypropyl)-ethylenediamine, N,N-diethyl-2-propyn-1-amine, N,N-diethyl-4-amino-2-butyn-1-ol, N,N-dimethyl-2-propyn-1-amine, N-2-ethylhexyl-3-aminosulfopropionic acid, pyridinium chloride, sodium salt of sulfated alkylphenol ethoxylates, sodium 2-ethylhexyl sulfate, nicotinic acid, nitrilotriacetic acid and salts derived from it, sodium nitrobenzenesulfonate, N-methallylpyridinium chloride, ortho-chlorobenzaldehyde, phosphonium salts, phthalamides, picolinic acid, polyetheramines, polyethyleneimines, polyvinylimidazole, propargyl alcohol, propargyl alcohol ethoxylate, propargyl alcohol propoxylate, sodium propynesulfonate, propionic acid, propylenediaminetetraacetic acid and salts derived from it, pyrrole, quaternized polyvinylimidazole, reaction product of 2-butyne-1,4-diol and epichlorohydrin.

The compositions of the invention may further comprise additives for improving the forming characteristics, examples being wax-based derivatives based on natural or synthetic waxes, e.g., waxes based on acrylic acid, polyethylene waxes, polytetrafluoroethylene (PTFE) waxes or wax derivatives or paraffins and their oxidation products.

Depending on their area of application, the compositions used in accordance with the invention may comprise polymer dispersions based on styrene, 4-hydroxystyrene, butadiene, acrylic acid, acrylate esters, acrylamides, acrylate salts, methacrylic acid, methacrylate esters, methacrylamides, methacrylate salts, and derivatives of acrylamide. It is also possible for the compositions of the invention to comprise polyurethane dispersions and polyesterurethane dispersions or polyurea dispersions.

Another group of compounds that may be present in the compositions of the invention embraces polyethylene glycols, polypropylene glycols, and copolymers of ethylene oxide and of propylene oxide with one another and with further alkoxylates, such as butene oxide.

The compositions of the invention comprising component A can be used in any applications for the passivation of metal surfaces. Such applications are the formation of a passivating layer (formation of a conversion coat), in particular the formation of a no-rinse conversion coat, i.e., processes with a reduced number of rinsing operations, on galvanized steel and aluminum, for example. The nature of application corresponds to industry standard methods, with the additional feature that the compositions of the invention are employed together with other components standard in industry for the corresponding application, or that they are contacted with the metal in additional treatment steps, such as spraying, rolling, dipping, coating, including electrocoating, for example, using appropriate formulations of the compositions of the invention, such as solutions, emulsions, dispersions, suspensions or aerosols.

The present specification further provides a passivating layer on a metal surface, preferably Al, Al alloys, Zn, Zn alloys, obtainable by contacting the metal surface with the composition of the invention.

Preferred embodiments of the composition of the invention and also of the components present in the composition, and preferred embodiments of the metal surface, have already been specified above.

The passivating layer of the invention meets the following requirements:
- it is corrosion-inhibiting, for many applications even without subsequent coating;
- it improves coating adhesion: that is, it is not hydrophobicizing, which is achieved by virtue of the fact that the copolymers used as component A in the compositions of the invention are completely hydrophilic;
- it is thin, thereby ensuring the dimensional compliance of the passivated workpieces;
- even at an elevated temperature of, say, 120° C. the passivating layer of the invention retains its corrosion-inhibiting, action;
- it is neutral in color relative to the substrate metal (metal surface) but is detectable with the eye, so that defects can be detected more easily and it is simple to distinguish passivated from nonpassivated parts;
- it is obtainable without complicated process steps.

A particular feature of the passivating layer of the invention is that even in the form of a very thin layer it exhibits an outstanding corrosion inhibition effect.

The thickness of the passivating layer of the invention formed on the surface of the metal is preferably $\leq 3$ µm. More preferably the thickness is 0.01 to 3 µm, very preferably 0.1 to 3 µm. The thickness of the layer is determined by differential weighing before and after the composition used in accordance with the invention has acted on the metal surface, assuming that the layer has a specific density of 1 kg/l. A layer thickness specified below is always a parameter thus determined, irrespective of what is the actual specific density of the layer.

These thin layers are enough to achieve outstanding corrosion protection. Such thin layers ensure the dimensional compliance of the passivated workpieces.

In one especially preferred embodiment the passivating layer of the invention contains no further metals other than the metals of the base metal, especially aluminum and zinc or alloy metals comprising aluminum or zinc; that is, the compositions used to prepare the passivating layer do not contain any metals or metal compounds. Even without the addition of further metals or metal compounds the passivating layers obtained when using the compositions of the invention comprising copolymers of component A exhibit an outstanding corrosion stability.

The present specification further provides a surface composed of a metal surface and the passivating layer of the invention. Suitable metal surfaces and those used with preference, and also passivating layers, have already been mentioned above.

The present specification additionally provides a process of forming the passivating layer of the invention on a metal surface, which involves contacting the metal surface with the composition of the invention. Suitable compositions and preferred embodiments of suitable compositions have already been mentioned above. Suitable metal surfaces and preferred embodiments of metal surfaces have likewise already been mentioned above.

In the compositions used in the process of the invention the copolymer used in accordance with the invention can be in the form of a solution, emulsion, suspension or aerosol. In the compositions of the invention the copolymer (component A) is preferably in aqueous solution.

The mode of application corresponds to industry standard methods. The metal surface is preferably contacted with compositions of the invention by the spraying of the composition onto the metal surface or by the dipping of the metal surface into the composition. The particular application method employed with particular preference depends on the number, size, and shape of the parts to be treated. Accordingly, contacting takes place preferably by means of a spraying, rolling or dipping process.

Where the passivating layer of the invention is applied to metal strips by phosphating, compositions in accordance with the present specification comprising phosphoric acid as component F may be applied by a roll-on or dry-place or no-rinse process, with the phosphating composition laid down in accordance with the invention being applied to the metal strip and dried without rinsing, a polymer film being formed.

The present specification further provides a process comprising the following steps:
a) where appropriate, cleaning the substrate metal surface to remove oils, fats, and dirt,
b) where appropriate, washing with water,
c) where appropriate, pickling to remove rust or other oxides,
d) where appropriate, washing with water,
e) contacting the metal surface with a composition comprising a copolymer (component A) synthesized from
  ea) 50 to 99.9% by weight of (meth)acrylic acid or salts thereof as component Aa
  eb) 0.1 to 50% by weight of a carboxylate-containing monomer of the formula I

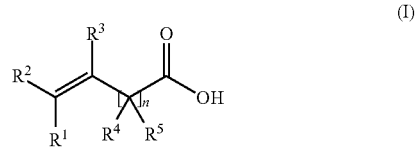

(I)

in which the symbols have the following definitions:
n is 0 to 10, preferably 0 to 5, more preferably 0 to 3;
$R^1$, $R^2$, and $R^3$ independently of one another are hydrogen, $C_1$ to $C_{18}$ alkyl, which may be branched or unbranched, $C_3$ to $C_6$ cycloalkyl, $C_2$ to $C_{18}$ alkenyl, which may be branched or unbranched, $C_3$ to $C_6$ cycloalkenyl, $C_6$ to $C_{12}$ aryl, which may be substituted by alkyl substituents or other aryl substituents, it being possible for the stated radicals $R^1$, $R^2$ and/or $R^3$ optionally to be substituted by at least one carboxyl group, or are a carboxyl group; preferably $R^1$, $R^2$, and $R^3$ are hydrogen or $C_1$ to $C_{18}$ alkyl, which is unbranched, and is optionally substituted by at least one carboxyl group, or are a carboxyl group; more preferably one of the radicals, $R^1$ or $R^2$ or $R^3$, is a carboxyl group and the other radicals are hydrogen or methyl; or R¹, R², and R³ are hydrogen or methyl;

R⁴ and R⁵ are independently of one another hydrogen, C₁ to C₁₈ alkyl, which may be branched or unbranched, C₃ to C₆ cycloalkyl, C₂ to C₁₈ alkenyl, which may be branched or unbranched, C₃ to C₆ cycloalkenyl, C₆ to C₁₂ aryl, which may be substituted by alkyl substituents or other aryl substituents; preferably R⁴ and R⁵ are hydrogen or C₁ to C₁₂ alkyl, which is unbranched; very preferably hydrogen or methyl;

or salts, anhydrides, esters of compounds of the formula I, very preferably maleic acid, fumaric acid, itaconic acid, crotonic acid or their salts, esters, anhydrides, with the exception of (meth)acrylic acid or salts thereof, as component Ab1, and/or 0.1 to 50% by weight of monomers containing groups containing phosphoric and/or phosphonic acid or salts thereof and polymerizable with the monomers specified under ea) and ec), and also with component Ab1, as component Ab2, ec) 0 to 30% by weight of further comonomers polymerizable with the monomers specified under ea) and eb), as component Ac;

f) where appropriate, washing with water,
g) where appropriate, aftertreatment.

The contacting of the metal surface with the copolymer (component A) is the passivating step, in particular a phosphating step, of the processes known to the skilled worker. The passivating layer of the invention is formed on the metal. Where phosphating is carried out in step e), it is possible to aftertreat the metal surface in g) with passivating additives. Preferably contacting with the composition of the invention takes place in step e).

Copolymers (component A) and compositions employed with preference have already been identified above.

Washing with water takes place between the individual process steps in order to prevent contamination of the solution required for the following step with components of the solution used in the preceding step. It is, however, also conceivable to carry out processes of the invention as no-rinse processes, i.e., without steps b), d), and f).

In the process known as the "no-rinse" process the composition used in accordance with the invention is generally either sprayed onto the substrate metal surface or transferred to the surface by means of application salts. This is followed by a period of exposure of generally in the range from 2 to 20 seconds then, without further intermediate rinsing, by drying of the composition used in accordance with the invention. Drying can take place, for example, in a heated oven.

The steps of cleaning (step a)) and of contacting the metal surface in the presence of the copolymer (component A) used in accordance with the invention and/or of the composition of the invention (step e)) may also be performed in one step, i.e., with a formulation comprising not only the customary detergents but also the copolymer used in accordance with the invention.

The process of the invention takes place in general at a temperature of from 5 to 100° C., preferably from 10 to 80° C., more preferably from 15 to 45° C.

The present specification further provides for the use of a composition comprising a) at least one polymer as component A synthesized from
   aa) 50 to 99.9% by weight of (meth)acrylic acid or salts thereof as component Aa
   ab1) 0.1 to 30% by weight of a carboxylate-containing monomer of the formula I

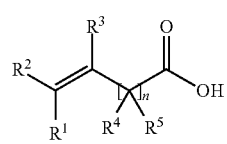

(I)

in which the symbols have the following definitions:

n is 0 to 10, preferably 0 to 5, more preferably 0 to 3;

R¹, R², and R³ independently of one another are hydrogen, C₁ to C₁₈ alkyl, which may be branched or unbranched, C₃ to C₆ cycloalkyl, C₂ to C₁₈ alkenyl, which may be branched or unbranched, C₃ to C₆ cycloalkenyl, C₆ to C₁₂ aryl, which may be substituted by alkyl substituents or other aryl substituents, it being possible for the stated radicals R¹, R² and/or R³ optionally to be substituted by at least one carboxyl group, or are a carboxyl group; preferably R¹, R², and R³ are hydrogen or C₁ to C₁₈ alkyl, which is unbranched, and is optionally substituted by at least one carboxyl group, or are a carboxyl group; more preferably one of the radicals, R¹ or R² or R³, is a carboxyl group and the other radicals are hydrogen or methyl; or R¹, R², and R³ are hydrogen or methyl;

R⁴ and R⁵ are independently of one another hydrogen, C₁ to C₁₈ alkyl, which may be branched or unbranched, C₃ to C₆ cycloalkyl, C₂ to C₁₈ alkenyl, which may be branched or unbranched, C₃ to C₆ cycloalkenyl, C₆ to C₁₂ aryl, which may be substituted by alkyl substituents or other aryl substituents; preferably R⁴ and R⁵ are hydrogen or C₁ to C₁₈ alkyl, which is unbranched, very preferably hydrogen or methyl;

or salts, anhydrides, esters of compounds of the formula I, very preferably maleic acid, fumaric acid, itaconic acid, crotonic acid or their salts, esters, anhydrides, with the exception of (meth)acrylic acid or salts thereof, as component Ab1, and/or ab2) 0.1 to 50% by weight of monomers containing groups containing phosphoric and/or phosphonic acid or salts thereof and polymerizable with the monomers specified under aa) and ac), and also with component Ab1, as component Ab2;

ac) 0 to 30% by weight of further comonomers polymerizable with the monomers specified under aa) and ab), as component Ac;

b) water or another solvent capable of dissolving, dispersing, suspending or emulsifying the polymer (component A), as component B;

c) if desired, further surface-active additives, dispersants, suspension agents and/or emulsifiers, as component C;

to passivate a metal surface.

Compositions used with preference, and copolymers (component A) used with preference in the compositions, have already been mentioned above. Metal surfaces used with preference, and also processes for passivating the metal surfaces that are conducted with preference, have likewise already been mentioned above.

In one preferred embodiment of the process of the invention, following the process of forming a passivating layer on a metal surface, the metal surface provided with the passivating layer of the invention can be provided, subsequent to process steps a) to g), with a coating material. Coating takes place in accordance with methods which are known to the skilled worker. The coating material used can, for example, be a powder coating material or an electrolytically depositable, especially cathodically depositable, deposition coating material.

The present specification accordingly further provides a coating system on a substrate metal surface, comprising at least one passivating layer X of the invention and at least one coating film, preferably two or more coating films, as layer(s) Y.

The passivating layer and its preferred embodiments have already been mentioned above. Suitable coating films are known to the skilled worker.

The coating system of the invention can be a multicoat paint system (two or more coating films) with additional layers. For example, a multicoat paint system may be composed of at least one of the following layers, which typically can be arranged as follows:
- a layer W which is pigmented and/or is provided with effect substances,
- a layer Z selected from the group consisting of primer, basecoat, undercoat, pigmented coat or coat provided with effect substances.

As color and/or effect coating materials in the layer Z and/or W, suitable coating materials include in principle all that are customary for these purposes and known to the skilled worker. They can be curable physically, thermally, with actinic radiation or both thermally and with actinic radiation (dual cure). They can be conventional basecoat materials, aqueous basecoat materials, substantially solvent-free and water-free liquid basecoat materials (100% systems), substantially solvent-free and water-free solid basecoat materials (pigmented powdercoating materials) or substantially solvent-free pigmented powdercoating dispersions (powder slurry basecoat materials). They may be heat-curable or dual cure, and internally or externally crosslinking.

It is possible to use one or more, preferably from 1 to 3, more preferably 1 or 2, and very preferably one color and/or effect coating material in the layers.

"Substantially solvent-free" means that the coating material in question has a residual volatile solvent content of <2.0% by weight, preferably <1.5% by weight, and more preferably <1.0% by weight. It is especially advantageous if the residual content is below the limit of detection by gas chromatography.

In the multicoat paint systems it is particularly preferred to employ aqueous basecoat materials such as those known from patent applications EP 0 089 497 A1, EP 0 256 540 A1, EP 0 260 447 A1, EP 0 297 576 A1, WO 96/12747, EP 0 523 610 A1, EP 0 228 003 A1, EP 0 397 806 A1, EP 0 574 417 A1, EP 0 531 510 A1, EP 0 581 211 A1, EP 0 708 788 A1, EP 0 593 454 A1, DE-A-43 28 092 A1, EP 0 299 148 A1, EP 0 394 737 A1, EP 0 590 484 A1, EP 0 234 362 A1, EP 0 234 361 A1, EP 0 543 817 A1, WO95/14721, EP 0 521 928 A1, EP 0 522 420 A1, EP 0 522 419 A1, EP 0 649 865 A1, EP 0 536 712 A1, EP 0 596 460 A1, EP 0 596 461 A1, EP 0 584 818 A1, EP 0 669 356 A1, EP 0 634 431 A1, EP 0 678 536 A1, EP 0 354 261 A1, EP 0 424 705 A1, WO 97/49745, WO 97/49747, EP 0 401 565 A1 or EP 0 817 684, column 5, lines 31 to 45.

The color and/or effect coating materials described above may serve to produce not only color and/or effect basecoats but also color- and/or effect-providing combination effect coats. By these are meant a coating which fulfils at least two functions in a multicoat color and/or effect paint system. Such functions include in particular that of protection against corrosion, promotion of adhesion, absorption of mechanical energy, and the provision of color and/or effect. In particular the combination effect coat serves to absorb mechanical energy and to provide color and/or effect at the same time; accordingly it fulfils the functions of a surfacer coat or antistonechip primer coat and of a basecoat. In addition, preferably, the combination effect coat also has a corrosion protection effect and/or adhesion promotion effect.

Typical thicknesses of the layer (W) and/or (Z) range from 0.1 to 2000 µm, preferably from 0.5 to 1000 µm, more preferably from 1 to 500 µm, very preferably from 1 to 250 µm, and in particular from 10 to 100 µm.

The coating materials which can be used in the multicoat paint systems may be color and/or effect pigments. Suitable color pigments include all organic or inorganic pigments which are customary in coating materials. Examples of organic and inorganic color pigments include titanium dioxide, micronized titanium dioxide, iron oxide pigments, carbon black, azopigments, phthalocyanine pigments, quinacridone pigments, and pyrrolopyrrole pigments.

The effect pigments are notable in particular for a platelet-like structure. Examples of effect pigments include the following: metal pigments, e.g., of aluminum, copper or other metals; interference pigments, such as metal-oxide-coated metal pigments, for example, e.g., titanium-dioxide-coated or mixed-oxide-coated aluminum, coated mica, such as titanium-dioxide-coated mica, and graphite effect pigments, for example. In order for example to improve the hardness, it can be advantageous to use UV-curable pigments and, where appropriate, fillers as well. These are radiation-curable compounds, e.g., acryloyl-functional silanes, coated pigments/fillers, which can therefore be included in the radiation cure operation.

The coating system of the invention is generally produced by a process comprising the steps of:
a) forming a passivating layer X in accordance with an abovementioned process of forming the passivating layer;
b) coating the passivating layer.

A process for forming the passivating layer, along with preferred embodiments of that process, has already been mentioned above. Coating processes suitable for step b) are known to the skilled worker.

The following examples further illustrate the invention.

EXAMPLES

Comparative Examples

Metal test panels (galvanized steel, 20 µm zinc) were passivated by a passivating method specified in table 1. The stability time was determined in a salt spray test.
Salt Spray Test The measure used for the corrosion inhibition effect is the result of a salt spray test according to DIN 50021. The stability time in the corrosion test is defined differently according to the type of corrosion damage observed.
- If white spots are formed with a diameter of generally more than 1 mm (Zn oxide or Al oxide, known as white rust) the stability time reported is the time after which the observed damage corresponds to evaluation stage 8 in DIN EN ISO 10289 of Apr. 2001, annex B, page 19.
- If black spots are formed with a diameter of generally less than 1 mm (in particular on zinc provided with a passivating layer) before white rust spots are formed, the stability time reported is the time after which the observed damage corresponds to evaluation stage 8 in DIN EN ISO 10289 of April 2001, annex A, page 9.

TABLE 1

| | Passivating method | Stability time |
|---|---|---|
| Comparative example | Passivation in $HNO_3$, 0.1% | <1 h |
| Comparative example | Commercial Cr(III) high-build passivation (EP-A 0 907 762) | >>10 h |

The reagents specified in table 2 are dissolved with the concentration C in 0.1% strength $HNO_3$. Metal test panels (galvanized steel, 20 µm zinc) are immersed in the solution for 1 minute and dried by suspending them overnight. The layer thicknesses determined by differential weighing are between 1 and 3 µm. The stability time is determined in a salt spray test.

Differential Weighing

The thickness of the layer is determined by differential weighing before and after the composition used in accordance with the invention has acted on the metal surface, on the assumption that the layer has a specific density of 1 kg/l. Reference to a layer thickness in the text below always refers to a parameter determined in this way, irrespective of the actual specific density of the layer.

TABLE 2

| Example | Reagent | C [% by weight] | Stability time [h] |
|---|---|---|---|
| 1 | Copolymer prepared by polymerization from 25% by weight of maleic anhydride and 75% by weight of acrylic acid and subsequent reaction with triethanolamine and water with heating (pH 3.5) | 1.5 | >30 |
| 2 | Copolymer prepared by polymerization from 22% by weight of maleic anhydride, 75% by weight of acrylic acid, and 3% by weight of vinylphosphonic acid and water at 100° C. (K value 14) | 1.5 | >30 |
| 3 | Copolymer prepared by polymerization from 22% by weight of maleic anhydride, 75% by weight of acrylic acid, and 3% by weight of vinylphosphonic acid and water at 120° C. (K value 31) | 1.5 | >33 |
| Comparative example 1 | Acrylic acid-methacrylic acid copolymer reacted with 1 mol of 3-dimethylaminopropylamine per carboxylate group | 5 | <1 |
| Comparative example 2 | Acrylic acid-methacrylic acid copolymer reacted with 1 mol of diethylenetriamine per carboxylate group | 5 | <1 |
| Comparative example 3 | Acrylic acid-methacrylic acid copolymer reacted with 1 mol of imidazole per carboxylate group | 5 | <1 |
| Comparative example 4 | Polyvinylpyrrolidone K value 30 (DE-A10005113) | 5 | <1 |

* The K value is the Fikentscher constant for characterizing the average molecular weight; cf. H.-G. Elias, Makromolekule Vol. 1, 5$^{th}$ edition, Huthig & Wepf Verlag, Basel 1990, page 99.

Preparation Instructions for the Copolymers Used in Accordance with the Invention Example 1

A 6 l pressure reactor provided with anchor stirrer, temperature control, nitrogen inlet and 2 feed ports is charged with 486 g of maleic anhydride (4.96 mol), 22.5 mg of iron sulfate, and 1000 g of deionized water.

This initial charge is heated under nitrogen to 115 to 120° C. When this temperature has been reached feed 1, consisting of 1665 g of acrylic acid (23.1 mol) and 1190 g of deionized water is metered in at a uniform rate over the course of 4 hours, and feed 2, consisting of 115.0 g of hydrogen peroxide (30%) and 258 g of deionized water, is metered in at a uniform rate over the course of 5 hours. After the end of feed 1 a further 190 g of deionized water are added. The reaction mixture is stirred at 120° C. for a further 2 hours. During the polymerization the pressure is maintained at 3 to 4 bar by careful release of excess pressure.

Cooling gives a yellowish, clear polymer solution.

To hydrolyze the anhydride groups, 672 g of triethanolamine (corresponding to 30% by weight, based on maleic acid and acrylic acid) are added to the polymer solution at a rate such that the internal temperature in the reactor does not exceed 40° C.

This gives a yellow, clear polymer solution having a solids content of 53%.

Example 2

A multi-necked flask provided with stirrer, internal thermometer, reflux condenser, and nitrogen inlet is charged with 73 g of maleic anhydride (0.73 mol), 3.375 mg of iron sulfate, and 150 g of deionized water. The reactor is rendered inert with nitrogen, while stirring. The mixture is heated with stirring to 100° C. Then simultaneously a mixture of 259 g of acrylic acid (3.6 mol), 10 g of vinylphosphonic acid (3% by weight based on maleic anhydride and acrylic acid), over 5 hours, and 277 g of hydrogen peroxide (30%) in water, over 6 hours, are metered in at a uniform rate.

The reaction mixture is held at 100° C. for a further 2 hours.

Cooling gives a yellowish, clear polymer solution having a solids content of 45.3%. The K value of the polymer solution (1% strength in deionized water) is 14.

Example 3

A 6 l pressure reactor provided with anchor stirrer, temperature control, nitrogen inlet and 2 feed ports is charged with 486 g of maleic anhydride (4.96 mol), 22.5 mg of iron sulfate, and 1000 g of deionized water.

This initial charge is heated under nitrogen to 115 to 120° C. When this temperature has been reached feed 1, consisting of 1665 g of acrylic acid (23.1 mol), 66 g of vinylphosphonic acid (3% by weight based on maleic anhydride and acrylic acid) and 1190 g of deionized water is metered in at a uniform rate over the course of 4 hours, and feed 2, consisting of 115 g of hydrogen peroxide (30%) and 258 g of deionized water, is metered in at a uniform rate over the course of 5 hours. After the end of feed 1 a further 190 g of deionized water are added. The reaction mixture is stirred at 120° C. for a further 2 hours. During the polymerization the pressure is maintained at 3 to 4 bar by careful release of excess pressure.

Cooling gives a yellowish, clear polymer solution having a solids content of 45.6%.

The K value of the polymer solution (1% strength in deionized water) is 31.

When comparing untreated metal panels with their treated counterparts (i.e., those provided with a passivating layer of the invention) a trebling in the stability time in the corrosion test is understood to be a reliable indication of a corrosion inhibition effect.

The stability time in the corrosion test can be improved further still by immersing the systems at a higher temperature (e.g., at 60° C.) or in more concentrated solutions, including nitric acid with a concentration changed from that of the examples specified above.

The invention claimed is:

1. A process for forming a passivating layer on a metal surface comprising the following steps:
   (i) cleaning the metal surface to remove oils, fats and dirt,
   (ii) optionally washing the cleaned metal surface,
   (iii) optionally pickling the metal surface to remove rust or other oxides,
   (iv) optionally washing the pickled metal surface with water, and
   (v) forming the passivating layer on the metal surface by contacting the metal surface with a Cr (VI) free composition having a pH value of 1 to 6, comprising:
      a) at least one terpolymer synthesized from 20 to 80% by weight of (meth)acrylic acid, 10 to 40% by weight of maleic anhydride, and 0.1 to 20% by weight of vinyl phosphonic acid as component A;
      b) water or a mixture of water and another water miscible solvent, the fraction of water in such a mixture is at least 75% by weight, which is capable of dissolving, dispersing, suspending or emulsifying the terpolymer of component A, as component B;
      c) at least one acid or one alkali metal or alkaline earth metal salt of said acid selected from the group consisting of phosphoric acid, sulfuric acid, sulfonic acids, formic acid, acetic acid, nitric acid, hydrofluoric acid, and hydrochloric acid, as component F; and
      d) compounds of Ce, Ni, Co, V, Fe, Zn, Zr, Ca, Mn, Mo, W, Cr and/or Bi, as component H.

2. A process according to claim 1, wherein the component H is selected from the group consisting of Fe, Zn, Zr and Ca.

3. A process according to claim 1, wherein the composition comprises further to components A, B and F wax-based derivatives based on natural or synthetic waxes.

4. A process according to claim 1, wherein the composition comprises further to components A, B, F and H wax-based derivatives based on natural or synthetic waxes.

5. A process according to claim 3, wherein the wax-based derivatives are waxes based on acrylic acid, polyethylene waxes, polytetrafluoroethylene (PTFE) waxes or wax derivatives or paraffins and their oxidation products.

6. A process according to claim 1, wherein the sulfonic acid as component F is a sulfonic acid selected from the group consisting of methanesulfonic acid, vinylsulfonic acid, allylsulfonic acid, m-nitrobenzenesulfonic acid, naphthalenesulfonic acid, and derivatives thereof.

7. A process according to claim 1, wherein component Aa is acrylic acid or a salt of acrylic acid, component Ab1 is maleic anhydride, and component Ab2 is vinylphosphonic acid or methacrylic acid phosphonoxyethyl ester.

8. A process according to claim 1, wherein the amount of acrylic acid is from 50 to 90% by weight.

9. A process according to claim 1, wherein the composition further comprises:
   a) surface active additives, dispersants, suspension agents and/or emulsifiers as component C, and/or
   b) at least one nitrogen containing base as component D and/or
   c) at least one salt, acid or base based on transition metal cations, transition metal oxo anions, fluorometallates or lanthanoides as component E, and/or
   d) at least one corrosion inhibitor as component G, and/or
   e) auxiliaries and additives as component I selected from the group consisting of conductivity pigments, conductive fillers and silica suspensions, and/or
   f) at least one complexing agent as component J, and/or
   g) further additives as component K.

10. A process according to claim 9, wherein the surface active additives are surfactants selected from the group consisting of alkyl and alkenyl alkoxylates of the type $R\text{-}EO_n/PO_m$ in which R represents linear or branched $C_6\text{-}C_{30}$ alkyl radicals, EO represents an ethylene oxide unit and PO represents a propylene oxide unit, wherein the EO and PO units are randomly arranged, and n and m independently of one another being greater than 1 and less than 100, alkyl phenol ethoxylates, EO/PO block copolymers, alkyl ether sulfates and alkylammonium salts.

11. A process according to claim 9, wherein the corrosion inhibitor G is at least one corrosion inhibitor selected from the group consisting of butynediol, benzotriazole, aldehydes, amine carboxylates, aminophenols, nitrophenols, amino alcohols, aminobenzimidazole, aminoimidazolines, aminotriazole, benzimidazolamines, benzothiazoles, benzotriazole derivatives, esters of boric acid with various alkanolamines, carboxylic acids and their esters, quinoline derivatives, dibenzyl sulfoxide, dicarboxylic acids and their esters, diisobutenylsuccinic acid, dithiophosphonic acid, fatty amines, fatty acid amides, guanidine derivatives, urea and its derivatives, laurylpyridinium chloride, maleamides, mercaptobenzimidazole, N-2-ethylhexyl-3-aminosulfopropionic acid, phosphonium salts, phthalamides amine- and sodium-neutralized phosphoric esters of alkyl alcohols, and also these phosphoric esters themselves, phosphoric esters of polyalkoxylates, phosphoric esters of polyethylene glycol, polyetheramines, sulfonium salts, sulfonic acids, thioethers, thioureas, thiuramide sulfides, cinnamic acid and its derivatives, zinc phosphates and zinc silicates, zirconium phosphates and zirconium silicates and alkynediol alkoxylates.

12. A process according to claim 9, wherein the corrosion inhibitor G is at least one corrosion inhibitor selected from the group consisting of butynediol, benztriazole and alkynediol alkoxylates.

13. A process according to claim 9, wherein the component I is a conductivity pigment.

14. A process according to claim 9, wherein the component J is a complexing agent.

* * * * *